(12) United States Patent
Antonio et al.

(10) Patent No.: US 6,339,611 B1
(45) Date of Patent: Jan. 15, 2002

(54) METHOD AND APPARATUS FOR CROSS POLARIZED ISOLATION IN A COMMUNICATION SYSTEM

(75) Inventors: Franklin P. Antonio, Del Mar; Leonard N. Schiff, San Diego; William G. Ames, Poway, all of CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/435,941

(22) Filed: Nov. 9, 1999

Related U.S. Application Data (60) Provisional application No. 60/107,699, filed on Nov. 9, 1998.

(51) Int. Cl.$^7$ ................................................. H04B 1/69
(52) U.S. Cl. ........................ 375/130; 342/361; 370/316
(58) Field of Search .................................. 375/130, 140, 375/141, 260; 370/316, 320, 321, 328, 335, 337; 455/52.3; 342/352, 361

(56) References Cited

U.S. PATENT DOCUMENTS

| | | | |
|---|---|---|---|
| 4,074,230 A | * 2/1978 | Icenbice, Jr. ................. 714/777 |
| 4,901,307 A | * 2/1990 | Gilhousen et al. ........... 370/320 |
| 5,485,485 A | * 1/1996 | Briskman et al. ............ 375/200 |
| 5,592,471 A | * 1/1997 | Briskman .................... 455/52.3 |
| 5,691,974 A | * 11/1997 | Zehavi et al. ................ 370/203 |
| 5,844,636 A | * 12/1998 | Joseph et al. ................ 348/845 |

* cited by examiner

*Primary Examiner*—Don N. Vo
(74) *Attorney, Agent, or Firm*—Philip R. Wadsworth; Gregory D. Ogrod; Thomas M. Thibault (57) ABSTRACT

The information signals are transferred to end users, customers, or service subscribers using at least two signal sources, generally satellites, and polarized radiation. Two polarization modes are employed, with the preferred modes being left-hand and right-hand circularly polarized radiation, although other polarization modes may be employed. The total number of channels can be divided among the polarization modes and transferred to end users either through the use of polarization switching in the receivers to selectively switch between the satellites, or by switching elements in the satellites (sources) to switch between polarization modes used for transmission.

18 Claims, 4 Drawing Sheets

METHOD AND APPARATUS FOR CROSS POLARIZED ISOLATION IN A COMMUNICATION SYSTEM

This application claims the benefit of U.S. Provisional application Ser. No. 60/107,699, filed Nov. 9, 1998.

BACKGROUND

I. Field of the Invention

The present invention relates to a wireless communication system for transmitting multiple channels of information to recipients which selectively demodulate only one channel at a time. More specifically, the invention relates to a method and apparatus for establishing or maintaining signal diversity in a satellite-based communication system in which multiple digital modulation channels are transmitted simultaneously to system users, and on the same frequency.

II. Related Art

New communication services have been proposed to provide pay-per listen types of services for mobile service users or consumers. A typical application that has been recently authorized for deployment in the United States is a consumer radio product referred to as Digital Audio Service (DAS) or Digital Audio Broadcasting (DAB). This type of service is intended for receiving one of a set of channels bearing information such as news, sports, music, weather, or other thematic entertainment presented with high audio quality. The quality level of the music is generally represented as being the same as that seen for optical storage media such as Compact (audio/optical) Discs commonly referred to as CDs, although a compression of approximately 10:1 is usually employed. These services are typically planned to operate over a bandwidth of about 12.5 MHz with a center frequency of around 2.3 GHz (referred to as the user reception frequency).

A variety of communication techniques have been developed for transferring information among or to a large number of system users at such frequencies. Techniques, such as time division multiplexing (TDM), frequency division multiplexing (FDM), and code division multiplexing (CDM) spread spectrum techniques. The use of CDM is documented for example in U.S. Pat. No. 4,901,307, entitled "Spread Spectrum Multiple Access Communication System Using Satellite Or Terrestrial Repeaters," and U.S. Pat. No. 5,691,974, entitled "Method And Apparatus For Using Full Spectrum Transmitted Power In A Spread Spectrum Communication System For Tracking Individual Recipient Phase Time And Energy," each of which are incorporated herein by reference.

While techniques such as CDM provide a relatively high signal gain and permit problems such as multipath fading to be more readily overcome, they do not totally eliminate such problems. Therefore, it is desirable to provide some form of signal diversity to reduce the deleterious effects of fading and additional problems associated with relative user movement. In addition, signal blockage by occasional buildings, foliage (trees), or geographic features (mountains and hills) can contribute to severe attenuation or complete blockage of some signals, preventing appropriate signal reception in some situations.

The problem of signal blockage takes on added importance where a long term communication link is desired. That is, instead of relatively short messages or calls, transmissions on the order of several minutes or more are desired. For example, transfer of radio like or audio programs through satellites, or large volume dedicated data transfers, require the receiver to have an adequate signal for many minutes or hours at a time. Signal blockage sufficient to interrupt this type of link is very deleterious, and can cause economic losses and long term customer base erosion where the link is part of a fee-for-service type link.

In order to assure high quality and uninterrupted reception of signals some form of signal diversity needs to be used. Generally, three types of diversity are commonly used in communication systems, and they are time, frequency, and space diversity. Time diversity is obtainable using data repetition, and time interleaving of data or signal components. A form of frequency diversity is inherently provided by techniques such as CDM in which the signal energy is spread over a wide bandwidth. Space or path diversity is obtained by providing multiple signal paths through simultaneous links with a mobile or remote signal recipient through two or more base stations for terrestrial systems; or two or more satellites or satellite beams, for space-based systems.

That is, for satellite communication systems, space or path diversity is obtained by transmitting, or receiving, over multiple signal paths and allowing a signal arriving over different paths to be received and processed separately for each path. Examples of using path diversity in multiple access communication systems are illustrated in U.S. Pat. Nos. 5,101,501 entitled "Soft Handoff In A CDMA Cellular Telephone System," and 5,109,390 entitled "Diversity Receiver In A CDAM Cellular Telephone System," which are incorporated herein by reference.

In order to provide robust signal or space diversity, satellite based communication systems or information transfer services, can transfer signals through two or more satellites at any time to an intended recipient. The signals are encoded in such a manner as to allow a user receiver to distinguish between them and process them accordingly. For TDM systems this means assigning different time slots or sets of slots, and for CDM systems this means assigning different PN code offsets or codes. Different frequencies can also be used in some systems, although far less desirable. Multiple layers or levels of coding can also be used. Generally, the user receiver then employs a series of digital receivers or what is referred to as a rake receiver, for accomplishing the signal reception.

However, typical satellite systems may have a lower than desired margin for signal separation. That is, unless certain techniques are employed, it is difficult to maintain separation of the signals due to path variations, and so forth. Unfortunately, these techniques require circuitry and software that makes receivers more expensive than desired or practical for some applications such as in the consumer products intended for use with the above audio systems. For example, when manufacturing receivers for use in pay-per-listen mobile applications on a large mass-market scale, costs and complexity are extremely important. Every small cost increment can greatly effect the profitability of an information service enterprise, and complexity can impact to both cost and reliability.

What is needed is a technique or apparatus that maintains a high quality communication link by providing or enhancing signal diversity while providing an inexpensive and reliable receiver suitable for mass produced consumer electronics.

SUMMARY OF THE INVENTION

One object of the present invention is to mitigate the effect of signal blockages from physical structures through appropriate signal diversity.

An advantage of the invention is that diversity reception can be maintained with no increase in receiver complexity. In fact, a lower cost RF front end may be accommodated while maintaining the desired high quality link.

The features and advantages of the present invention are realized by using at least two signal sources, generally satellites, and polarized radiation to transfer the desired communication signals to end users, customers, or service subscribers. Two polarization modes are employed, with the preferred modes being left-hand and right-hand circularly polarized radiation. However, in some configurations, vertical and horizontal polarized radiation may be employed. The total number of channels can be divided among the polarization modes and transferred to end users either through the use of polarization switching in the receivers to selectively switch between the satellites, or by switching elements in the satellites (sources) to switch between polarization modes used for transmission.

DESCRIPTION OF THE DRAWINGS

The present invention is described with reference to the accompanying drawings. In the drawings, like reference numbers indicate identical or functionally similar elements, and the left-most digits of a reference number identify the drawing in which the reference number first appears. In the drawings.

DESCRIPTION OF PREFERRED EMBODIMENTS

As discussed above, new digital communication services have been proposed for providing what is referred to as CD quality radio for vehicles, including, automobiles, trucks, mass transit, and trains. Such a service is intended to provide a series of information channels each operating in one thematic motif. That is, a series of say 12 or more channels of music or information such as news, weather or sports, are provided from which an end user can select one. Each channel then has one theme of information or musical style that determines the programming it carries.

In order to provide this type of service, new digital communication systems and techniques promise to provide relative good quality communication links. The use of an all digital modulation and reception scheme or system allows maximum matching of system output to the desired digital waveforms used for CD quality reception. In addition, newer communication systems should have excess capacity available which can be used to transfer or provide such music services with much less cost than constructing an entire new infrastructure. CDMA type communication systems are one such new system that would lend themselves well to transferring high quality digital signals.

Figure 1:
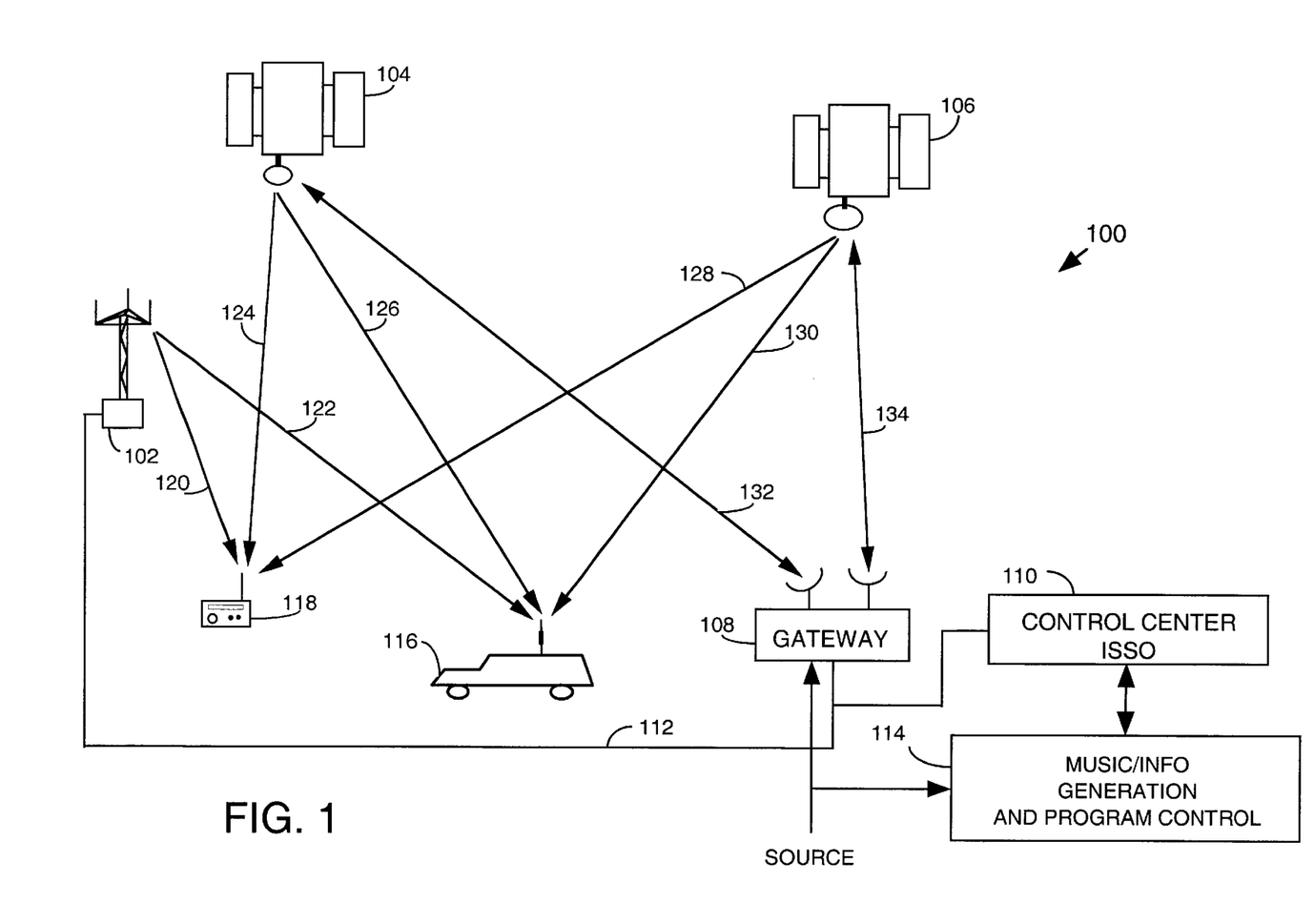
FIG. 1 illustrates an exemplary wireless radio information system constructed and operating according to one embodiment of the present invention.

An exemplary proposed wireless information, entertainment, or communication system 100 in which the present invention can be used is illustrated in FIG. 1. System 100 can be a news or music program service that provides 10 to 30, or more or less, different channels for system or service subscribers, customers, or users to select from at any given time. Some of these channels can involve higher data rates than the others, depending on the service being provided, there being no requirement that all channels operate at equal rates. An exemplary anticipated overall data transfer rate for system 100 is on the order of 5 Mbps providing 30 or 40 high data rate channels each using 128 kbps transfer rates. Each of these channels can be further sub-divided to provide lower rate channels, as desired, as would be known.

In FIG. 1, communication system 100 uses known modulation techniques, such as TDM or CDM, to prepare and transfer information bearing communication signals to remote or mobile system users. In the portion of the communication system illustrated in FIG. 1, one base station 102 and two satellites 104 and 106, along with an associated gateway or hub 108 are shown for effecting communications with two mobile stations or radios 116 and 118, or other such stations. Such devices or elements are generally well known in the art, although they may be modified as described below to accommodate the signals provided by the invention.

Mobile stations, user terminals, or radios 116 and 118 each have or comprise a wireless communication signal receiver, such as might be typically found in a vehicle or a hand-held consumer radio product. Here, user terminal 116 is illustrated as a portable handheld radio. While these radios are discussed as being mobile, it is also understood that the teachings of the invention are applicable to fixed units or other types of terminals where remote wireless service is desired, such as in many remote areas.

In order to realize the present invention, two or more satellites are used to provide signals to desired service areas. As shown in FIG. 1, two satellites in view of the radios or service subscribers at any given time provide a minimum desired level of space diversity. A typical satellite configuration provides two geosynchronous satellites to cover a land mass the size of a continent or a desired geographical area (geopolitical boundary). For example, two satellites are typically considered for providing service to the United States having coverage that is referred to as CONUS (continental US), and positioned at 80° and 110° elevations. Obviously more satellites may be used considering desired capacity and system costs, as is well understood in the art. In some systems, LEO or other orbits could be used, but that generally requires correspondingly more complex circuitry for switching between satellites, and is not preferable at this time for inexpensive consumer products. However, the present technique is not limited to a specific delivery platform as will be seen by the embodiment also using terrestrial base stations discussed later below.

It is contemplated for this example that satellites 104 and 106 provide beams covering generally overlapping geographic regions. It is readily understood that the beam coverage or service areas for different satellites, and antenna patterns for terrestrial sites may overlap completely or partially in a given region depending on the communication system design and the type of service being offered. Space diversity may also be achieved between any of these communication regions or devices, as discussed further below.

In FIG. 1, some possible signal paths are illustrated for communications being established between user radios 116 and 118 and terrestrial base station 102, or through satellites 104 and 106 to one or more gateways, satellite base stations, or centralized hubs 108. The base station-user portions of communication links between base station 102 and user radios 116 and 118 are illustrated by lines 120 and 122, respectively. The satellite-user portions of communication links between gateway 108 and radios 116 and 118 through satellite 104 are illustrated by lines 124 and 126, respectively. The satellite-user portions of communication links between gateway 108 and radios 116 and 118 through satellite 106 are illustrated by lines 128 and 130, respectively. The gateway-satellite portions of these communication links are illustrated by a series of lines 132, and 134.

As seen in FIG. 1, communication system 100 generally uses a system controller or control center 110, which employs a switch network, which could be referred to as an information service switching office (ISSO) to communicate with base stations and gateways. ISSO 110 typically includes interface and processing circuitry for providing system-wide control over timing, synchronization, channel setup, and certain operations for gateways or base stations, including orthogonal code assignments, time slot definition and assignments, and so forth, as would be known, and to control routing of information channels. A communication link 112 connecting ISSO 110 to various system gateways or base stations can be established using known techniques such as, but not limited to, high data rate dedicated lines, optical fiber links, or microwave or dedicated satellite communication links.

An information generation or program control center 114 is shown providing the information to be broadcast to control center 110. Music or other information can be generated from various known sources at center 114 or also provided from remotely located origination sources or services, such as known radio and network news or financial information services, or music signal generation or compilation facilities or studios. This input can be provided over a specialized (high data rate) switched network, or other known dedicated communication links. Gateways generally interface directly with such sources and may not require the use of an ISSO for this function. Alternatively, other control and command centers such as a ground operations command and control centers, which also communicate directly with satellites, are generally connected to the gateways. The assignment of various time slots and channel sequencing discussed below is generally controlled by the gateways or control center 100.

Each satellite shown in FIG. 1 is charged with transmitting channels of information to subscribers. That is, using the satellites or terrestrial base stations (discussed below) to transmit multi-channel communication signals that are channelized using known techniques, such as orthogonal CDM codes or TDM time slots as discussed above, to provide different information to different system users or subscribers depending on which channel they are "tuned to" at the time. However, it is not enough to simply broadcast the desired signals from the satellites. In order to assure high quality signals and assure reception under various conditions over long periods, it is very desirable, as discussed above, to maintain space diversity in the signals to assure that signal blockages and other effects do not prevent or severely impair adequate reception, and to combine the signals for improved quality.

Therefore, in satellite based communication system or information transfer service 100, signals are generally transferred through at least two satellites to an intended recipient subscriber. Signals are prepared and transmitted to the satellites from satellite base stations or gateways, or by terrestrial service base stations in some configurations, substantially simultaneously. The signals are in turn retransmitted from each of the satellites substantially simultaneously on the same frequency to allow the use of spatial diversity. The signals are encoded in such a manner as to allow the receiver to distinguish between them and process them accordingly in the receiver. For TDM systems this means assigning different time slots or sets of slots, and for CDM systems this means assigning different PN code time or phase offsets, or codes. CDM systems generally use a pilot signal for power monitoring and demodulation. Different frequencies can also be used in some systems, although far less desirable. Additional encoding, interleaving, and processing of the data can take place as desired within a system design using techniques well known in the art.

Figure 2:
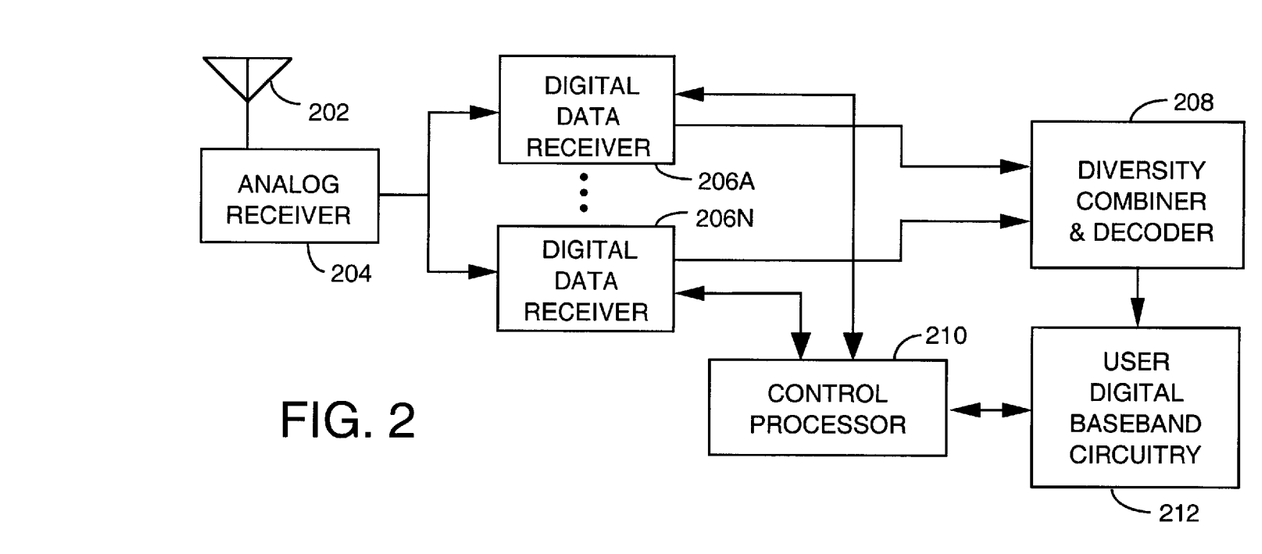
FIG. 2 illustrates an exemplary diversity mode receiver useful in a radio receiver found in the system of FIG. 1.

Typical diversity mode reception is used to receive signals from one or more base stations. This is accomplished by receiving or processing signals from each source (satellites or base stations) in separate signal processing fingers in a digital "rake receiver." The output of a respective digital receiver for each finger is then combined with the other outputs to form a single output for further decoding etc. for presentation to an end user. A known technique such as maximal ratio combining can be employed in this process. This is shown in FIG. 2 where a typical rake receiver structure 200 is illustrated. When a mobile receiver or radio is removed from areas serviced by terrestrial type base stations, such as in rural areas well outside of urban centers, the signals are received from gateways through one or more satellites. Again, a rake receiver is used to process these signals to arrive at the desired output.

In FIG. 2, radio or receiver 200 has a demodulator portion with an antenna 202 for receiving communication signals, which is connected to an analog receiver 204 where the signals are downconverted, amplified, and digitized, before being translated to an IF or baseband frequency and subjected to filtering and further amplification. Various schemes for RF-to-IF-to-Baseband frequency downconversion and analog-to-digital conversion for channel signals are well known in the art. Digitized signals are output by analog receiver 204 and provided as inputs to at least one digital data receiver 206A. Additional digital data receivers (206B–206N) are used to obtain signal diversity though alternate signal paths, and form the fingers of a RAKE design receiver. These data receivers, alone or in combination track and receive subscriber signals along several possible propagation paths to provide diversity mode processing. Those skilled in the art will readily recognize the factors that determine the number of digital receivers employed, such as typical level of diversity available, complexity, manufacturing reliability, cost, etc., which are used to provide an initial selection for this number.

The radio receiver or subscriber unit also includes at least one control processor 210 coupled to data receivers 206A–206N, which provides among other functions, basic signal processing, timing, handoff control or coordination, and diversity combining. Another basic control function often performed by control processor 210, is the selection of appropriate codes or time slots, depending on technique, to be used for reception.

The outputs of data receivers 206A–206N are coupled to a diversity combiner and decoder 208 which provides a single output to digital baseband circuitry 212 within the radio. The timing and coordination of this transfer is generally controlled by processor 210. The baseband circuitry comprises the remainder of the processing and presentation elements used within the radio receiver to transfer information to a radio user. That is, signal or data storage elements, such as transient or long term digital memory; output devices such as LCD or video display screens, speakers, A/D elements, and analog signal processing elements; etc., all form parts of the subscriber baseband circuitry which uses elements well known in the art.

Figure 3:
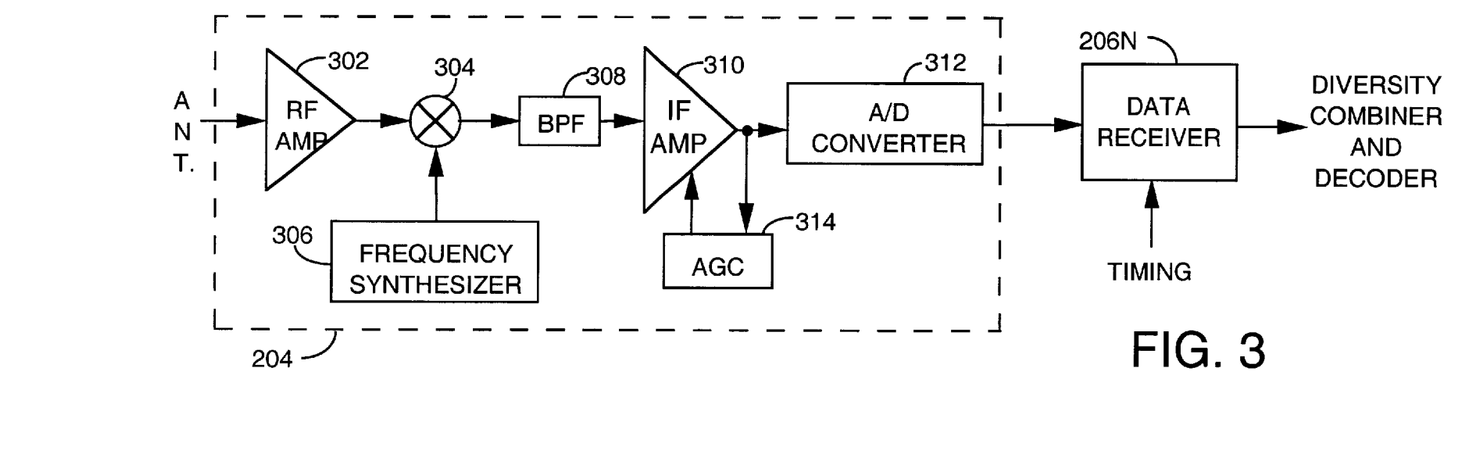
FIG. 3 illustrates an exemplary receiver down-conversion circuit found useful in the radio receiver of FIG. 2.

A more detailed view of one processing path in analog receiver 204 is shown in FIG. 3, where signals received by antenna 202 are coupled to a downconverter portion where the signals are amplified in an RF amplifier 302, and then provided as an input to a signal mixer 304. The output of a tunable frequency synthesizer 306 is provided as a second input for the mixer, and acts to translate the amplified RF signals to an IF frequency. The output of frequency synthesizer 306 can be electronically controlled as in the case of a VCO, using a frequency adjustment signal, such as to at least partially compensate the impact of known fading, and Doppler shifting effects.

The IF signals are then transferred to a bandpass filter (BPF) 308 for filtering to remove noise and unwanted spectra, and then transferred to a variable gain IF amplifier 310 for further amplification. In FIG. 3, a gain control element 314 is used to effect gain control over IF amplifier 310, to compensate for long term fading, and energy losses or attenuation, such as would be known to those skilled in the electronics arts. Generally, a gain control signal is generated by subsequent portions of the demodulator as discussed further below.

The resulting amplified IF signals produced by IF amplifier 310 are transferred to an analog-to-digital (A/D) converter 312 where they are digitized at an appropriate clock rate, although the A/D converter could easily reside elsewhere in the demodulation circuitry, for example forming a closely coupled part of the digital data receiver. Digitized IF signals are then output from A/D converter 312 to data receivers. Those skilled in the art will readily appreciate that A/D converter 312 can be constructed so as to provide channel splitting and two separate A/D converter paths.

The above description for the elements in FIG. 3 represents one processing or downconversion path for signals being received by analog receiver 204. Additional receiver sections or downconversion paths are used for each signal being received at the same time having a different frequency or polarization mode. These communication signals are processed in a manner similar to that discussed with respect to FIG. 3. However, the present invention acts to eliminate the need for extra downconversion and other processing elements before digital signal processing.

However, it is generally difficult to maintain separation of the signals (discriminate between) in typical satellite systems due to the changes to the signal path lengths and effects of multipath signals. Certain techniques can be used to assist in this process using diversity mode reception, but require circuitry and software that makes receivers more expensive than desired, as discussed above. The present invention addresses this situation by using an isolation scheme in generating signals, referred to as cross-polarization isolation, to provide diversity with increased margin, and without using different frequencies and requiring more complex multiple receiver chains. That is, the present invention implements a space, and in some embodiments time, diversity processing technique so that additional isolation is provided between signals received from different sources (for example, satellites) while doing so in a minimal amount of inexpensive hardware. The complexity of the receivers is effectively decreased, which also provides a more economical solution for some commercial products.

In one form, the present invention consists of providing two satellites to transfer signals to service subscribers with different polarization modes, relative to each other. That is, each satellite is configured to transmit communication signals using circularly polarized radiation to form a circularly polarized beam, each using a polarization mode that is oppositely (orthogonally) polarized to the other. This can be accomplished using one of a variety of known transmission, transponder, and antenna elements. Other polarization modes such as linearly polarized beams can be used within the teachings of the invention, but it is generally harder to maintain orthogonality at a desired level over large distances considering the curvature of the Earth's surface and orbital patterns. Therefore, in a preferred embodiment of the invention, one satellite projects circularly polarized radiation using Left-Hand Circularly Polarized (LHCP) radiation and the other Right-Hand Circularly Polarized (RHCP).

Figure 4A:
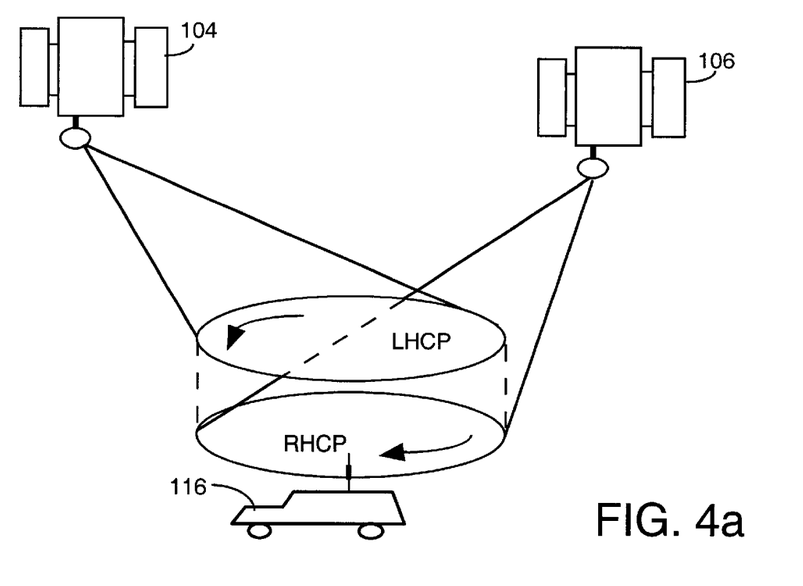
FIG. 4a illustrates an exemplary polarized beam pattern useful for implementing an embodiment of the invention in the system of FIG. 1.

The use of circularly polarized beams is illustrated generally in FIG. 4a, where each satellite 104 and 106 projects a beam 404 or 406, respectively, that is observed or received by radio 118, and each has a distinctly separate polarization mode ($M_1$, $M_2$, . . . ; circular or linear, here). Beam 404 is shown being or using LHCP radiation, while beam 406 uses RHCP radiation. However, these roles can obviously be reversed, or even dynamically changed as desired, as discussed further below.

At the same time, each receiver is manufactured with an RF section or antenna structure which can be alternatively tuned to receive either left- or right-hand polarized signals efficiently. Therefore, a polarization isolation or cross-polarization scheme is used to provide diversity with increased margin.

Figure 5:
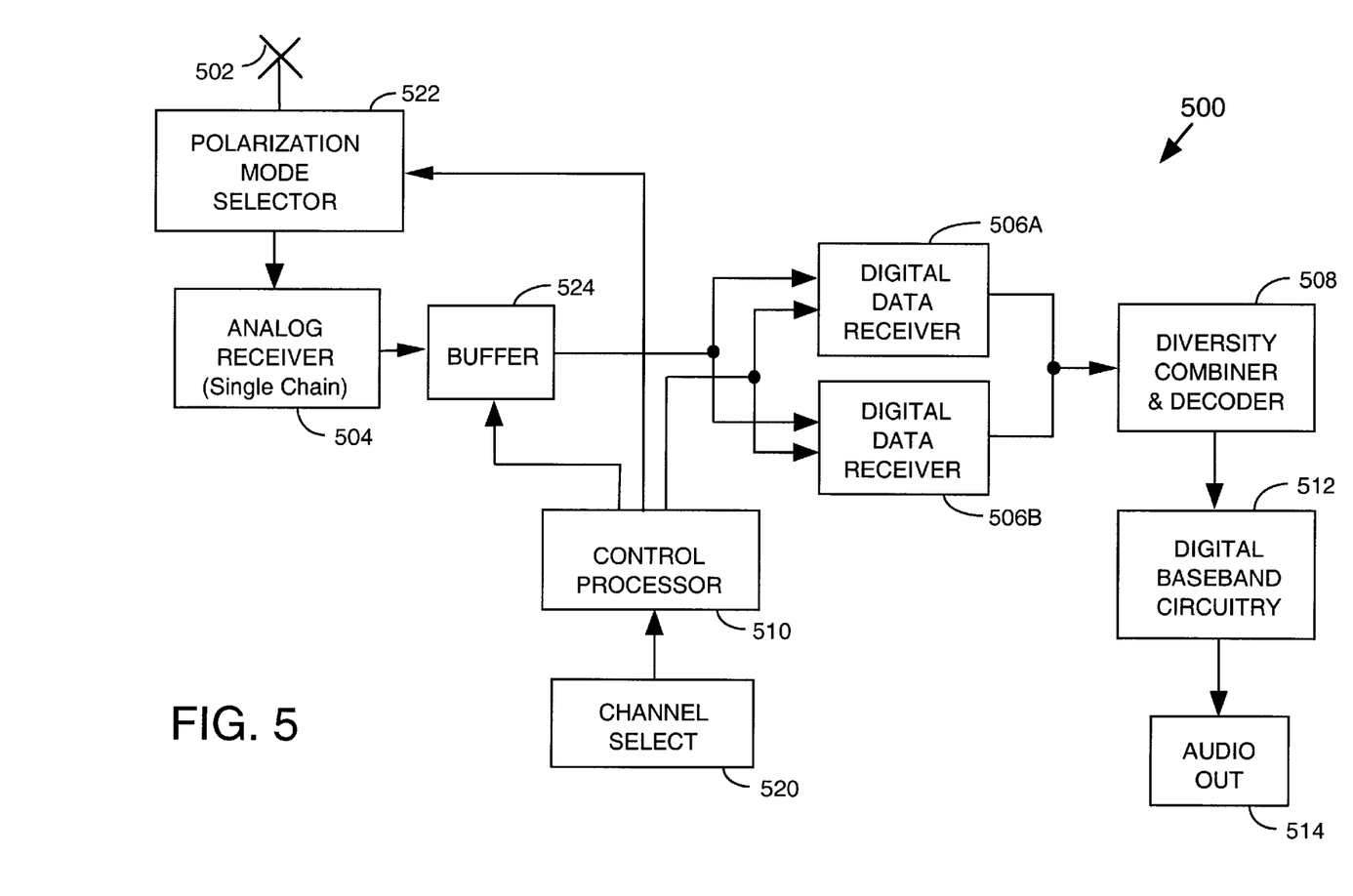
FIG. 5 illustrates an exemplary diversity mode receiver useful in the system of FIG. 1 for receiving the signals shown in FIGS. 4a and 4b, according to a preferred embodiment of the present invention.

An exemplary receiver is shown in FIG. 5, where a radio or receiver 500 has an antenna 502 for receiving communication signals, which is connected to an analog receiver 504 where the signals are downconverted, amplified, and digitized, before being translated to an IF or baseband frequency and subjected to filtering and further amplification, as before. Notice that analog receiver 504 uses a single downconversion chain for implementing the present invention. Digitized signals are output by analog receiver 504 and provided as inputs to at least one digital data receiver 506A. Preferably, two or more digital data receivers (206B–206N) are used to obtain signal diversity through the alternate signal paths provided by using two satellites (and additional ones for terrestrial transmitters discussed below), and form the fingers of a RAKE design receiver. These data receivers, alone or in combination track and receive subscriber signals along the several possible propagation paths to provide diversity mode processing. As before, those skilled in the art will readily recognize the factors that determine the number of digital receivers employed.

Radio receiver or subscriber unit 500 also includes at least one control processor 510 coupled to data receivers 506A–506N, which provides among other functions, basic signal processing, timing, handoff control or coordination, and diversity combining. Another basic control function often performed by control processor 510, is the selection of appropriate codes or time slots, depending on technique, to be used for reception.

The outputs of data receivers 506A–506N are coupled to a diversity combiner and decoder 508 which provides a single output to digital baseband circuitry 512 within the radio receiver. The timing and coordination of this transfer is generally controlled by processor 510. The baseband circuitry comprises processing and presentation elements used within the radio receiver to transfer information to a radio user. That is, signal or data storage elements, such as transient or long term digital memory; output devices such as LCD or video display screens, A/D elements, and analog signal processing elements; etc., all form parts of the subscriber baseband circuitry which uses elements well known in the art. An exemplary output device 514 labeled as "audio out" is shown which represents speakers, and possibly the power amplifiers and wiring used to operate a speaker system, such as in a vehicle.

As is discussed further below, the signals being processed use time compression of the data in order to transfer the same amount of data in a smaller period of time. To accommodate this compression, one or more signal or data buffers 524 are used. Such buffers allow the accumulation of the data over a short period at a higher rate, and then transfer of that data to other elements in the receiver at a slower rate. Sometimes referred to as time compression buffering. For the present example, data originally presented at a data rate of D is transmitted/received at a data rate of 2 D (rate is ND where N is number of groups of channels being used) but forwarded from the buffer at rate D. However, signal processing in stages after the buffer could use a rate other than D in some configurations. Signal or data buffers 524 comprise elements well known in the art such as RAM integrated circuits or various types of Flash memory, magnetic data storage, and so forth, as is known in the art.

It is contemplated that buffers which will hold data covering on the order of several seconds of presentation material are to be used in DAB systems. An exemplary system is proposed using buffers which would store eight (8) seconds worth of data or more over a 4 second period. Therefore, a system designer determines the data rate for the underlying information being transferred, the rate at which the information will be transmitted, the amount of time over which data should be accumulated for diversity (and other known) purposes and computes the size of the buffer based on the number of bits required to store that amount of information. For example, data transferred at 128 kbps requires a buffer on the order of 1024 k-bits (for example, a conventional 1 megabit RAM memory) in size to store 8 seconds worth of presentation material.

Alternative rates (and sizes) for the buffer output can be chosen based on the desired operating characteristics of the receivers, and other delays to be compensated for. That is, buffer 524, or additional buffers (not shown) can be used to account for certain path delays experienced in communication system 100, and compensate for some timing issues associated with frequency pre/post-correction, error adjustment, and Doppler. Someties elements referred to as de-skewing buffers are used.

A channel selection element 520, such as a series of buttons on a radio, or other known user interface device can be used to communicate a desired channel selection to control processor 510 which in turn uses this information to alter the polarization and other characteristics of the receiver elements to tune to the desired channel. To this end, a polarization selection element 522 can be used to select the polarization of the signal that is to be received by or transferred into receiver 500. Circuits and components useful to manufacture polarization selector 522 are well known. For example, one or more polarization filters that are configured to reject all but certain polarization modes could be used. These elements can be formed adjacent to, or even as part of, the antenna structure, or as part of analog receiver 504, as desired, as is known.

Each satellite divides the total number of channels of information (signals) it is going to transmit into two equal groups. For purposes of discussion these are labeled as an 'A' group and a 'B' group. Each satellite transmits all channels contained within one group and then all of the channels contained within the other group. Therefore, one satellite broadcasts group 'A' signals over a preselected period of time, generally followed by a preselected guard time (band) or dead period, say on the order of a few milliseconds, to account for delay variations created by the satellite orbits and position of subscribers. The satellite then transmits the 'B' group of channel signals, and so forth, alternating between the two groups of signals. The second satellite uses the same groups or grouping of channels to form groups 'A' and 'B,' but broadcasts them in a different order. Here, commencing with group 'B' and then 'A' and so forth.

One feature of the invention is that no matter what method of signal multiplexing or waveform generation (TDM, CDM, etc.) is used, this alternate channel grouping and polarization can be used. For example, each of the groups illustrated and discussed below can comprise channels of information appropriately "covered" or coded using known PN codes or orthogonal codes such as Walsh codes to distinguish the individual channels, or information intended to be received and associated with a given channel. Alternatively, each of the groups can represent groupings of time slots over which data is transferred with given time slots corresponding to preselected channels. In either case, the information signals are transferred as frames of data that are processed and transferred over time using the channels and polarization modes. This means that a certain number of frames of data, 1 or more, for each signal are transferred during each time period for a given mode, with additional frames being transferred in the next appropriate period, and so forth. For example, one frame n then n+1 during a first period, and frames n+2 and n+3 the next and so forth.

In a preferred embodiment, no dead time or guard period is used between the transmission of one group on one satellite and a subsequent transmission on the next satellite. In this situation, a few data symbols may be missed during the period the receiver is switching to receive from the other satellite, through polarization switching. However, the number of symbols that can be lost over a typical signal frame time scale that spans many seconds is very small, and is generally spread out over several channels. Therefore, the useful transfer of any one program is not sufficiently negatively impacted to be a problem nor to require a guard period for settling. However, such time periods may be used in some configurations to provide an additional benefit Whenever time periods or guard times are used, they are not periods of non-transmission or devoid of any signal, but generally a period when "null" or zero value data is transferred to allow certain circuitry such as that which tracks the satellite signals or adjusts frequency tuning or gain, and so forth, to have a signal to detect and still operate accordingly.

The result of this grouping of channels and polarization processing is shown in Table I below where an exemplary Radio 1 is receiving one of the channels in group A, and an exemplary Radio 2 is receiving one of the channels in group B. Clearly, many radios or receivers will preferably be receiving signals at any time, some using group A and some using group B, and some switching between the two groups, as would be known. In Table I, the first satellite broadcasts the A and then B group while the second satellite broadcasts B and then A.

TABLE I

| Satellite | Channel Group Transmission Order | Radio 1 Reception Order | Radio 2 Reception Order |
|---|---|---|---|
| Sat-1 | ABABAB . . . AB | AØAØAØ . . . AØ | ØBØBØB . . . ØB |
| Sat-2 | BABABA . . . BA | ØAØAØA . . . ØA | BØBØBØ . . . BØ | where Ø indicates no reception is undertaken from the listed satellite during that period of time, or received noise or signals are treated as predefined null data.

If the time delay for implementing diversity is set as a value 'T', then the full A and then B group cycle time is 2 T in length. A down converter chain used in each radio receiver is configured to switch between the two polarization modes, and, thus, the 2 satellites or signal sources, every T seconds. This is accomplished by simply changing the receiver antenna or reception elements between one mode and the other, here, a right-hand circular polarization (RHC) mode and a left-hand circular polarization (LHC) mode.

This can be accomplished using one of a variety of known elements such as using a circularly polarized patch antenna with two different feed connections, one for each mode (RHC and LHC). Each feed can be connected to amplification circuits or elements, such as a well known and commercially available low noise amplifier (LNA). The modes can be selected by either mechanically or electronically switching the feeds on and off, that is, connect/disconnect or, alternatively, attenuate/not attenuate or by simply powering down the LNA for the feed not to be used. This provides a very low complexity command and control feature, and selection of the desired mode at the antenna. Otherwise, both modes can be transferred to a remotely located radio and then one selected.

The result is full spatial diversity and full time diversity. In tests or simulations this technique has produced a several dB improvement in the received signals when working with the two-satellite case.

The inter-source interference (between satellites) is reduced by the use of polarization and is based on the amount of the polarization purity of the receive antenna. That purity is subject to factors well known in the art. The CONUS pattern or elevations listed above provide fairly good polarization purity and what is referred to as low off boresight (beam center) degradation. If a typical isolation on the order of 10 dB is achieved, the signal transmission should be quite close to interference free. In addition, this approach only requires the use of a single down converter chain, maintaining a more reliable and inexpensive receiver. Only a slightly more expensive antenna than normal for such consumer radios might be needed, with some switching, and an extra LNA.

The mobile stations or radios need to synchronize their reception/switching plus certain receiver timing functions such as used for channel multiplexing, interleaving, delay elements or buffer processing, antenna switching, code timing, and so forth, in order to match the ABABA or BABABA patterns from the satellites. This can be accomplished using one of several known techniques, including, but not limited to, using a system universal time reference, such as is available for GPS location systems, using feedback elements that correct local clocks and for frequency error or drift, using synchronization channels, and so forth. For example, see U.S. patent application Ser. No. 08/723,724 entitled "Determination Of Oscillator Errors In Satellite Communication Systems," and Ser. No. 08/733,490 entitled "Method And Apparatus For Precorrecting Time And Frequency In Communications Systems," which are both incorporated herein by reference.

Another manner in which to achieve the desired spatial and time diversity using the technique of the present invention is presented in Tables II and III below. In Tables II and III, the same groups or groupings of A and B channels are used, but they are labeled according to their respective progression or transmission varying over time. That is, transmission of the channels forming group A starting at a time t=1 provides channel $A_1$, while the same channels forming group A starting at a time t=2 provides channel $A_2$, group A starting at a time t=3 provides channel $A_3$, and so forth. The same holds true for group B as it forms $B_1$, $B_2$, $B_3$, and so forth.

In Table II, each pairing or set of A and B channels that start at a same relative time in a sequence (1, 2, 3, . . . ) are permutated or transposed in some preselected fashion with respect to each other when being transmitted from the opposite satellite or signal source. Therefore, channel group $A_1$ is transmitted from one satellite while channel group $B_1$ is transmitted from the other, $A_2$ from one while $B_2$ is transmitted from the other, and so forth.

TABLE II

| Sats. | Channel Group Transmission Order | Radio 1 Reception Order | Radio 2 Reception Order |
|---|---|---|---|
| Sat-1 | $A_1B_1A_2B_2A_3B_3$ . . . $A_nB_n$ | $A_1Ø\ A_2Ø\ A_3Ø$ . . . $A_nØ$ | $B_1Ø\ B_2Ø\ B_3Ø$ . . . $B_nØ$ |
| Sat-2 | $B_1A_1B_2A_2B_3A_3$ . . . $B_nA_n$ | $Ø\ A_1Ø\ A_2Ø\ A_3$ . . . $Ø\ A_n$ | $Ø\ B_1Ø\ B_2Ø\ B_3$ . . . $Ø\ B_n$ |

In TABLE III, the pattern differs in that the two groups are not permutated as it were, but are time delayed relative to each other. Therefore, channel group $A_1$ is transmitted from one satellite while channel group $B_0$ is transmitted from the other (equivalent to either null data or no channels being transferred from second satellite during an initial phase), $A_2$ from one while $B_1$ is transmitted from the other, $A_3$ from one while $B_2$ is transmitted from the other, and so forth. This process can be expanded to larger numbers of divisions or groups as well, as discussed below.

TABLE III

| Sats. | Channel Group Transmission Order | Radio 1 Reception Order | Radio 2 Reception Order |
|---|---|---|---|
| Sat-1 | $A_1B_1A_2B_2A_3B_3$ . . . $A_n\ B_n$ | $A_1Ø\ A_2Ø\ A_3Ø$ . . . $A_nØ$ | $B_1Ø\ B_2Ø\ B_3Ø$ . . . $B_nØ$ |
| Sat-2 | $B_0A_1B_1A_2B_2A_3$ . . . $B_{n-1}A_n$ | $Ø\ A_1Ø\ A_2Ø\ A_3$ . . . $Ø\ A_n$ | $Ø\ B_1Ø\ B_2ØB_3$ . . . $ØB_n$ |

When each satellite broadcasts in a different one of two polarization modes, the timing or symbol or bit rate of the signals being transferred over the respective channels is increased so that the same amount of information is transferred in a shorter amount of time. That is, in order for a given amount of information or data to be transferred as usual with one effective data rate over the period 2 T, it is actually transferred at twice that rate over the shorter period T, as part of any one group of channels. The data or information forming the channels in each group is transmitted with a 2:1 timing or speedup factor (for a two group [A/B] configuration) relative to the original transmission rate, followed by the preselected guard time or dead period, if any. Other groupings of channels, such as N groups from M total channels will use a N:1 speed-up factor or higher rate ratio in order to transfer the data over the appropriate period that is allocated. That is, the total number is divided into N groups and each is transmitted sequentially with N different phases such that 1/N channels are transmitted in each group at N times the speed.

The received signals are then accumulated or stored as received in one or more fairly large but inexpensive buffers, in each radio receiver (112, 114). This allows that the resulting signal to be stored at the higher transfer rate and played out at the original slower rate, which is slower than the transmission rate. In a typical application, it is expected that the buffers will accumulate or accommodate about 4 or more seconds worth of incoming signal so that about 4 seconds or more of a channel signal is received in any polarization mode. This provides an ability to substantially constantly rotate through the polarizations and maintain a diversity mode.

An alternative method for transferring signals from the satellites to the radio involves leaving the polarization mode for radio receiver inputs fixed at any time and switching the output of the satellites over time. A channel is selected for reception and would again fall into either group A or group B. Now, however, the group determines the polarization mode to be used, either LHCP or RHCP, or other modes as employed (such as V and H). Each satellite divides the channels of information (signals) to be transmitted into two equal groups, A and B. Each satellite transmits all channels contained within the A group on one polarization mode $M_1$ (say RHCP) and the B group on the other polarization mode $M_2$ (say LHCP). Here, the polarization modes are alternated. This is illustrated in Tables IV and 5 below.

TABLE IV

| Satellite | Polarization Transmission Pattern | Radio 1 Reception Order | Radio 2 Reception Order |
|---|---|---|---|
| Sat-1 | $M_1M_2M_1\ldots M_2M_1$ | $M_1\emptyset\ M_1\emptyset \ldots M_1\emptyset$ | $\emptyset\ M_2\emptyset\ M_2 \ldots \emptyset\ M_2$ |
| Sat-2 | $M_2M_1M_2\ldots M_1M_2$ | $\emptyset\ M_1\emptyset\ M_1 \ldots \emptyset\ M_1$ | $M_2\emptyset\ M_2\emptyset \ldots M_2\emptyset$ |

TABLE V

| Satellite | Polarization Transmission Pattern | Radio 1 Reception Order | Radio 2 Reception Order |
|---|---|---|---|
| Sat-1 | RH LH RH LH ... RH LH | RH∅RH∅ ... RH∅ | ∅LH∅LH ... ∅LH |
| Sat-2 | LH RH LH RH ... LH RH | ∅RH∅RH ... ∅RH | LH∅LH∅ ... LH∅ |

A radio receiver selects either RHCP or LHCP polarization mode for the signals to be received, depending on the entertainment channel to be received, and remains in this reception mode during that listening session. This technique could allow for less hardware and complexity in the receiver (one LNA).

Figure 4B:
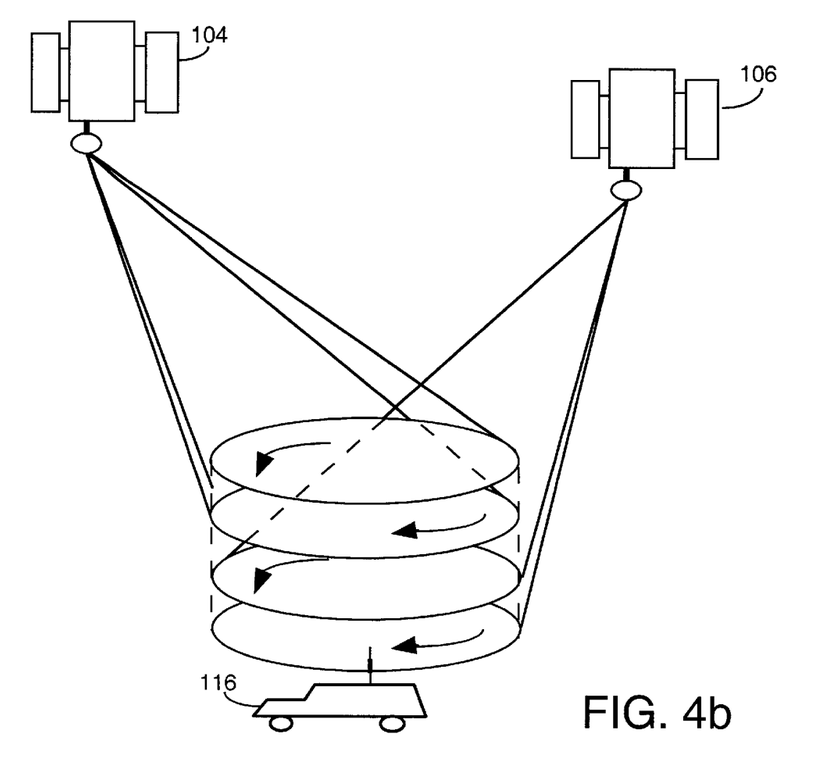
FIG. 4b illustrates an exemplary alternative polarized beam pattern useful for implementing another embodiment of the invention in the system of FIG. 1.

The use of switched circularly polarized beams is illustrated generally in FIG. 4b, where each satellite 104 and 106 projects two beams 404, 408 and 406, 410, respectively, that are observed or received by radio 118. Beams 404, 408 and 406, 410 each have a separate polarization mode, with beams 404 and 410 shown being LHCP, while beams 406 and 408 are RHCP. However, these roles can obviously be reversed, and be dynamically changed as desired.

One aspect of this latter technique is that it is harder to extend or generalize to additional modes of operation. That is, where there are additional polarization modes, say linear, or other parameters used by each satellite to create additional isolation modes, it becomes increasingly difficult to have the receivers select among the modes without unacceptably increasing complexity and cost.

The above grouping of channels or signals for system subscribers can be generalized. In other embodiments, each satellite divides the total number of M channels of information (signals) to be transferred into N equal groups, where M is divisible by N. Each satellite then transmits these groups in sequential order. For example, in one embodiment, each satellite divides channels of information (signals) into three equal groups (N=3), which are labeled as A, B, and C, for purposes of discussion. Each satellite transmits all channels contained within the three groups in patterns such as:

A B C A B C A B C A B C A B C A B C

C A B C A B C A B C A B C A B C A B

B C A B C A B C A B C A B C A B C A

In yet another example embodiment, each satellite divides channels of information into four equal groups (N=4) which are labeled as A, B, C, and D, for purposes of discussion. Each satellite transmits all channels contained within the four groups resulting in patterns such as:

A B C D A B C D A B C D A B C D A B C D

C D A B C D A B C D A B C D A B C D A B

D A B C D A B C D A B C D A B C D A B C

B C D A B C D A B C D A B C D A B C D A

OR

A B C D A B C D A B C D A B C D A B C D

B A D C B A D C B A D C B A D C B A D C

C D A B C D A C B D A B C D A B C D A B

D C B A D C B A D C B A D C B A D C B A

Here the M channels are divided into N groups and the groups permutated in order to arrive at the desired transmission scheme.

These patterns or schemes can be combined with using the period for C or periods for C and D to receive signals from low elevation sources, say on the order of 25 degrees or less. This is useful to receive signals from terrestrial base stations while higher elevation signals arrive from the satellites. This provides improved isolation between the terrestrial and satellite transmitters, where both are used in a communication system. In this configuration, if one antenna port or output uses RHCP signals received above 25°, a second LHCP signals above 25°, and a remaining one or two ports for signals but below 25°, then a desired signal reception pattern could be to receive from port 1, port 2, port 3, and so forth in the N–3 case; or port 1, port 3, port 2, port 4, and so forth in the N=4 case.

This type of antenna scheme takes advantage of an antenna that has increased gain above 25° and decreased below. With one RHC and one LHC port. With a $3^{rd}$ port for below 25°, the satellites are isolated and the terrestrial is more effectively isolated from the satellites. In addition, such multi-port antenna structures can be used to receive from satellites in multiple orbits that are higher or lower relative to each other as well. Alternatively, separate antennas can be used as desired, which are tuned to have lesser or greater gain over certain preselected elevation angles, in order to address all or each of the ranges desired for satellites and/or terrestrial transmitters. Sectored or sectorized antennas could be employed for terrestrial reception to reduce interference between transmitters.

In addition, it may be desirable to employ non-polarized radiation for the terrestrial portion of the link. In this situation, the above multiple port structure could use the last two ports for this radiation, or separate terrestrial antennas could be used that have higher gain at lower elevation angles, and so forth.

For those regions or applications in which signals are received from both 1 or more satellites and 1 or more terrestrial transmitters, a different scheme can be used to assure proper diversity. Here, the frequency band is subdivided into certain portions and the satellites allocated one portion and the terrestrial transmitters other portions. For example, the entire 12.5 MHz band can be simply divided in half with the two (or more) satellites using one half (occupying approximately 6.25 MHz) and the terrestrial transmitters occupying the other half. Since polarization isolation is used for the satellites, they can share their portion of the total bandwidth, not requiring a separate dedicated portion for each individual satellite, and they leave the rest for the terrestrial transmitters. The remaining band can be allocated to the terrestrial transmitters in known frequency reuse patterns, as desired. For example, a 3-fold reuse plan should allow a large number of terrestrial base stations to be used to cover large areas without significant interference.

In addition, more complex bandwidth allocations can be used to achieve further improvements in isolation. For example, a scheme as that shown in Table VI could be used.

TABLE VI

| ←------12.5 MHz total bandwidth------→ | | | | |
|---|---|---|---|---|
| Terrestrial 1 | Satellites 1/2 | Terrestrial 2 | Satellites 1/2 | Terrestrial 3 |
| 2.08 MHz | 3.13 MHz | 2.08 MHz | 3.13 MHz | 2.08 MHz |

Several advantages occur in using the above processes. One is that different rates and codes can be used for terrestrial transmitters versus the satellites. In addition, one satellite and one or more terrestrial transmitters can be used in diversity combination where reception from the other satellite is blocked, and so forth. The terrestrial transmitters can use regeneration and a different form of modulation if desired, especially when broadcasting in a separate part of the total frequency band allocated for this application (that is, one half or other portions of the band while satellites are constrained to operate in the other half or non-terrestrial portions).

A potential advantage can be realized when using a CDM waveform approach. In this situation, different PN codes can be used for the terrestrial transmitters (probably one code set employing phase or time offsets to generate different "codes" for each) and satellites (probably an other set using phase offsets between each) which allows the different PN codes to be detected and used to automatically adjust loop bandwidth for pilot signal recovery loops and such in the receivers. Basing loop control parameters or settings on the PN of the source can provide a very powerful and efficient control mechanism for improving the operation of such loops.

Note that multi-port, such as 2-port or 3-port, antennas or antenna structures can be used to advantage. In some applications, simply having multiple antennas which are configured to have more gain at some elevations or directions could be used. In addition, specialized antennas that are sensitive to polarization modes can be used. For example antenna 502 can be configured using elements that are sensitive to polarization modes which can be selectively chosen to receive desired signals (switched between).

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as the invention is:

1. A method for isolation of transmissions of multiple channels over communication signals from multiple signal sources comprising the steps of:

dividing said channels into N groups of channels;

transfer one of N groups of channels from one signal source using a first polarization mode; and transferring another of said N groups of channels from a second source using a second polarization mode that is substantially orthogonal to the first.

2. The method of claim 1 wherein each of said N groups of channels are transferred during one preselected time period at a rate of 1/N times the total number of channels.

3. A method for isolation of transmissions of multiple channels over communication signals from multiple signal sources comprising the steps of:

dividing said channels into N groups of channels;

transmitting one of N groups of channels from one signal source using a first polarization mode while substantially simultaneously transmitting a second of said N groups of channels from a second source using a second polarization mode that is substantially orthogonal to the first; and transmitting a third of said N groups of channels from said one signal source using said first polarization mode while substantially simultaneously transmitting a fourth of said N groups of channels from said second source using said second polarization mode.

4. The method of claim 3 wherein N is 2 and said first and third groups comprise the same channels, and said second and fourth groups comprise the same channels.

5. The method of claim 3 wherein N is 4 and said first and third groups comprise the same channels.

6. The method of claim 3 wherein said signal sources comprise two or more satellites.

7. The method of claim 3 wherein said satellites are in geosynchronous orbits.

8. The method of claim 3 wherein said signal sources comprise two or more terrestrial transmitters.

9. The method of claim 3 wherein said signals comprise CDM type communication signals.

10. The method of claim 3 wherein said signal sources comprise TDM type communication signals.

11. The method of claim 3 wherein said signal sources comprise two or more satellites and two or more terrestrial transmitters.

12. The method of claim 11 wherein said satellites transfer signals in one or more predefined portions of a total assigned bandwidth, and said terrestrial transmitters transmit signals in one or more predefined portions in the remainder of said assigned bandwidth.

13. The method of claim 11 wherein said satellites and said terrestrial transmitters transmit CDM type signals that use different PN spreading codes as between said satellites and said transmitters.

14. Apparatus for isolation of transmissions of multiple channels over communication signals from multiple signal sources comprising the steps of:

means for dividing said channels into N groups of channels;

means for transmitting one of N groups of channels from one signal source using a first polarization mode while substantially simultaneously transmitting a second of said N groups of channels from a second source using a second polarization mode that is substantially orthogonal to the first; and means for transmitting a third of said N groups of channels from said one signal source using said first polarization mode while substantially simultaneously transmitting a fourth of said N groups of channels from said second source using said second polarization mode.

15. The apparatus of claim 14 further comprising means for receiving said one of said N groups of channels from one of said signal sources using a receiver with a polarization mode selection element.

16. The apparatus of claim 15 further comprising means for configuring said polarization element to receive one of N groups of channels from said one signal source during one preselected time period, and a second one of said N groups of channels from said one signal source during a subsequent preselected time period.

17. The apparatus of claim 15 further comprising means for configuring first and second signal sources to transmit said one of N groups of channels during one preselected time period using a first polarization mode, and a second one of said N groups of channels from said one signal source during a subsequent preselected time period, using a second polarization mode.

18. The method of claim 14 wherein each of said N groups of channels are transferred during one preselected time period at a rate of 1/N times the total number of channels.

* * * * *